Figure 5:
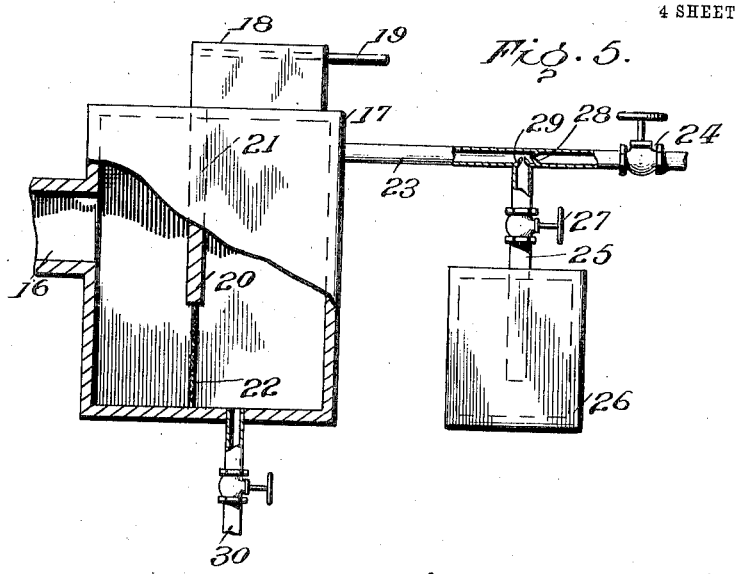

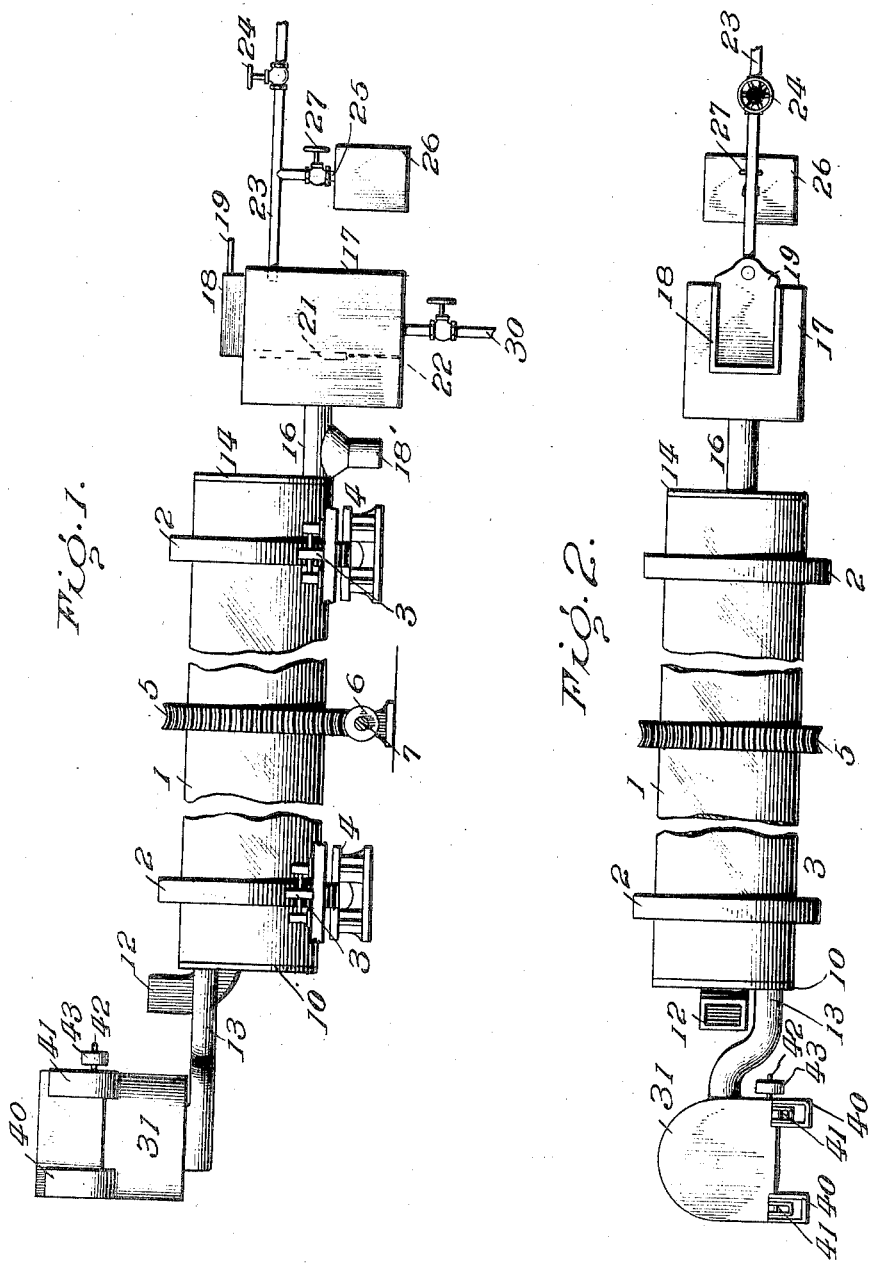

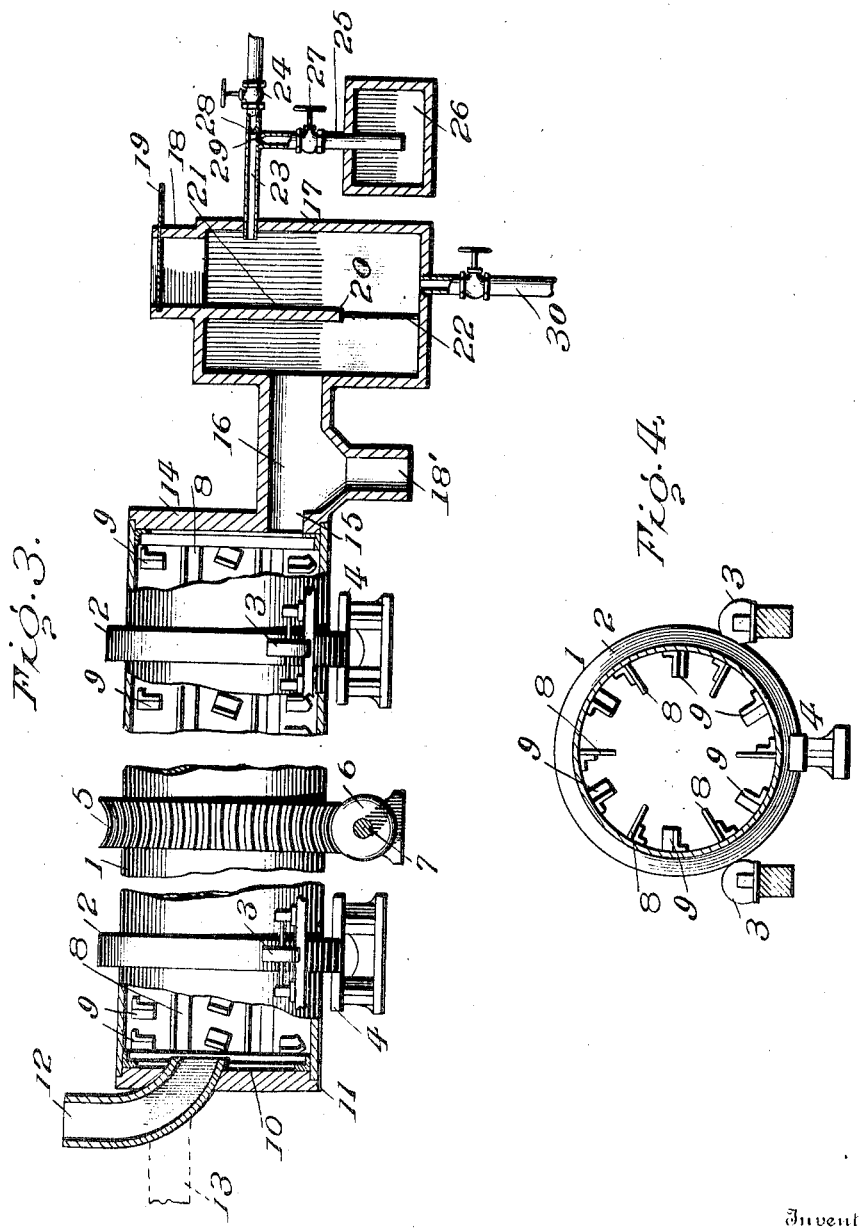

No. 811,002. PATENTED JAN. 30, 1906.
K. TSUJI.
APPARATUS FOR PRODUCING EFFLORESCENCE.
APPLICATION FILED JAN. 11, 1905.

4 SHEETS—SHEET 4.

Inventor
Kasho Tsuji

Witnesses
Jno. Mirie
G. R. Thomas

By Stewart & Stewart
Attorneys

UNITED STATES PATENT OFFICE.

KASHO TSUJI, OF TAKAOKA, JAPAN.

APPARATUS FOR PRODUCING EFFLORESCENCE.

No. 811,002.          Specification of Letters Patent.          Patented Jan. 30, 1906.

Application filed January 11, 1905. Serial No. 240,663.

*To all whom it may concern:*

Be it known that I, KASHO TSUJI, a subject of the Emperor of Japan, and a resident of Takaoka, Toyama, Japan, have invented certain new and useful Improvements in an Apparatus for Producing Efflorescence, of which the following is a specification.

My invention relates to certain new and useful improvements in an apparatus which is particularly designed for causing the efflorescence of cement and similar material in the process of their manufacture.

It is well known that when cement is brought in contact with moisture its crystalline formation is broken up, and this chemical change causes the cement, when afterward used, to set more slowly; and the object of my invention is to bring the cement when in its crystalline condition into intimate contact with moisture, the amount of moisture being regulated to effect the efflorescence of the cement in a rapid and economical manner and to the desired extent.

With this object in view my invention consists of certain constructions and combination of parts, the preferred form of which will be first specifically described and then the nature and scope of the invention particularly pointed out in the claims.

In the drawings and specification accompanying this application I have for the sake of illustration shown and described a machine embodying my invention in its preferred form. I desire to have it understood, however, that the particular construction shown and described is merely for the purpose of illustrating my invention, and many changes can be made in the form, construction, and arrangement of parts without departing from the spirit thereof.

Figure 6:
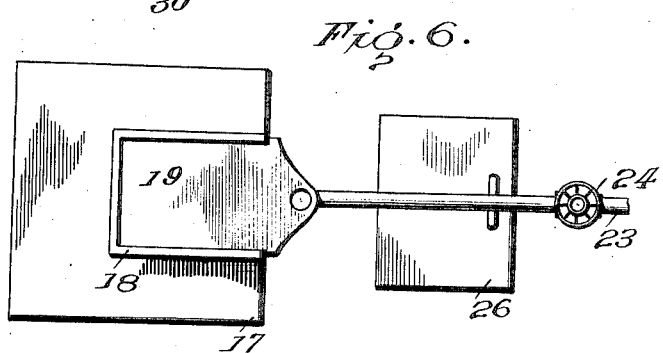
Figure 7:
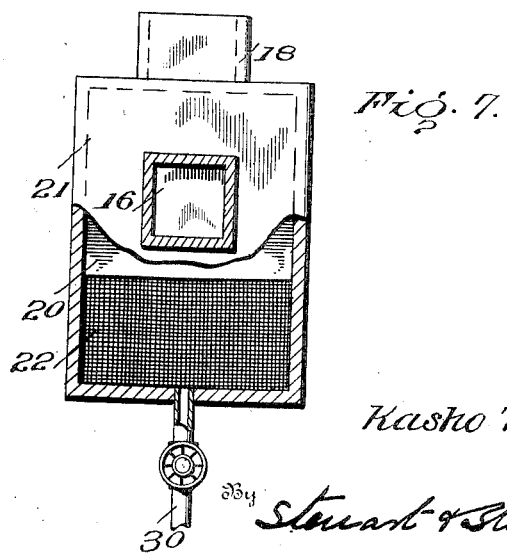
Figure 9:
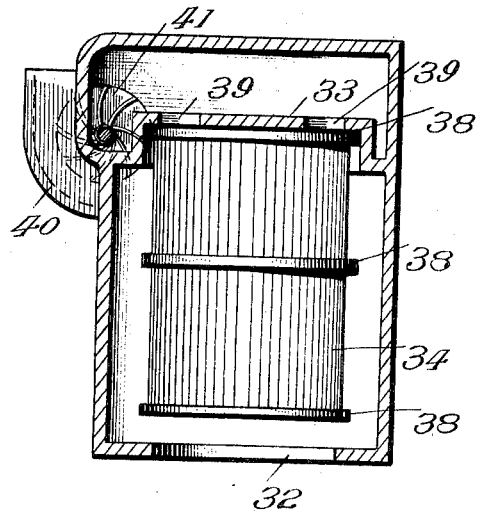
Figure 8:
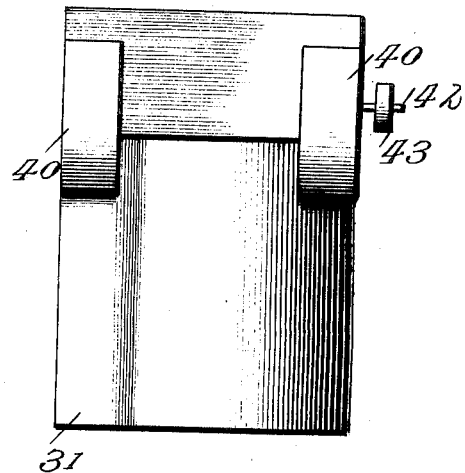
Figure 11:
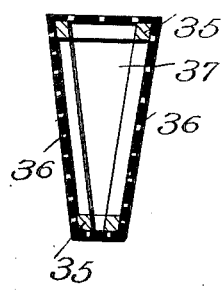
Figure 10:
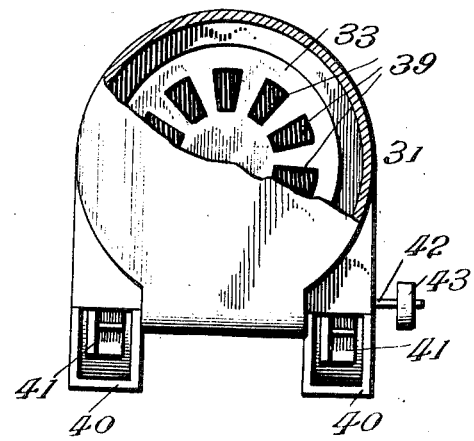

Referring to the drawings, wherein the same part is designated by the same reference-numeral wherever it occurs, Figure 1 is a side elevation of the preferred form of my invention, a part of the drum being broken away for convenience. Fig. 2 is a top plan view of Fig. 1. Fig. 3 is a view similar to Fig. 1, parts, however, being shown in central longitudinal section. Fig. 4 is a cross-section of the drum or cylinder. Fig. 5 is a side elevation, partly in section, of the device by which moisture is supplied by the drum. Fig. 6 is a top plan view of the construction shown in Fig. 5. Fig. 7 is an end view of Fig. 5, partly broken away. Fig. 8 is a side elevation of the filtering device by which the dust carried out of the cylinder by the air is collected. Fig. 9 is a view, partly in section, of Fig. 8, the section being taken at right angles to Fig. 8. Fig. 10 is a top plan view of the construction shown in Fig. 8, partly broken away. Fig. 11 is a detailed view of one of the filter-frames.

1 designates a cylinder or drum provided with supporting-rings 2, which run on rollers 3, supported by suitable beds 4.

5 is a worm-gear secured around the cylinder, and 6 is a worm carried on the shaft 7 in engagement with the gear 5. The shaft 7 is suitably driven and by its rotation rotates the drum 1.

Located on the interior of the drum are a series of shelves 8, which are arranged substantially radially of the drum and extend longitudinally thereof. These shelves in the rotation of the drum pick up material in the drum and carry it up and drop it.

9 represents a series of plates which are located between the shelves 8, with their faces arranged at an angle to the axis of rotation. These plates, as will be seen from Fig. 3, form a kind of interrupted screw through the cylinder and upon the rotation of the cylinder will cause material in the cylinder to be fed therethrough.

10 is a stationary plate provided with a shoulder 11, the shouldered portion of the plate extending into the drum and closing one end thereof. Through this plate extends the pipe 12, by means of which material is fed into the drum and the pipe 13, the other end of which extends to the filter, which will be hereinafter described.

14 is a plate similar to the plate 10 and closing the delivery end of the drum. The plate 14 is provided with an opening 15 near its bottom, from which extends the pipe 16, connected with the air-moistening apparatus 17. The pipe 16 has located in its lower portion the delivery-pipe 18', by which the material after being treated is delivered from the drum. The moistening-box 17 consists of a substantially rectangular box, as is shown in Figs. 3, 5, 6, and 7, provided at its top with a mouth 18, in which is mounted the sliding plate 19 for controlling the opening in the mouth 18.

20 is a partition which extends through the box and divides the box into two parts. This partition at its upper portion 21 is made solid, whereas its lower portion 22 is a form of a screen composed of wire-gauze or the like.

23 is a pipe connected to a suitable source of steam-supply, the steam being controlled by a valve 24.

25 is a pipe extending into a tank 26, the pipe 25 being provided with a controlling-valve 27.

The pipe 23 is provided on its interior with a nozzle 28 adjacent to the pipe 25, which is also provided with a nozzle 29, as is shown in Fig. 5. These two nozzles are arranged in the position shown in Fig. 5, forming an injector, whereby steam issuing from the nozzle 28 and passing over the nozzle 29 will draw water from the tank 26 and cause the water and steam to mix in the pipe 23. The amount of water and steam can be regulated by the valves 24 and 27.

In the operation of these parts of the apparatus the valve 19 is opened to any extent that may be found desirable, and a supply of steam is allowed to enter the box by opening the valve 24. The steam entering the box strikes against the portion 21 and is deflected downward and passes through the screen 22. If steam alone will not supply sufficient moisture to the air admitted through the mouth 18, the valve 27 is opened, which allows water to be sucked up from the tank 26 and to be mixed with the steam and pass into the box 17. The network or screen 22 will stop the water carried by the steam which is not sufficiently broken up. 30 is a pipe by which this water may be drawn out. The moisture-laden air passes through the box 17, through the pipe 16, and into the drum, where it comes in contact with the cement or other material which has been fed into the drum. The shelves 8 operate to pick the material in the drum up and drop it, breaking up the mass of material and at the same time allow the moisture in the air to reach all parts of the mass. The projections 9 act at the same time to feed the material through the drum until it passes into the pipe 16 and out of the delivery-pipe 18'. The moisture-laden air in passing through the drum picks up and carries away a large amount of valuable dust, and in order to recover the dust I connect to the pipe 13 a filtering device 31. The form of the filter shown consists of a casing provided in its bottom with a suitable opening 32, through which the pipe 13 is connected. 33 is a partition arranged transversely to the casing and near the upper end. Suspended from the partition 33 are filter-frames 34. One of these filter-frames is shown in cross-section in Fig. 11 and consists of a wedge-shaped frame 35, formed of wood or similar material, around which is wrapped cloth 36. The bottom of these frames is also covered with cloth, as at 37, while the top of the frame is left open. These frames are separate from each other and are held in position by the hoops 38. The partition 33 is provided with a series of openings 39, which coincide with the tops of the filter-frames, as is shown in Fig. 10. In order to cause the air to pass through the drum and filter-frames, I provide the filter with a pair of projections 40, in which are mounted the rotary fans 41, mounted on the shaft 42 and provided with the pulley 43, which may be driven in any suitable manner. The air drawn from the drum by the fans is thus caused to pass through cloth surrounding the filter-frames, where the dust carried by the air is left, and then out through the openings in the projection 40.

The construction and operation of my apparatus is such that the amount of moisture delivered to the material in the drum can be regulated. By regulating the speed of rotation of the drum the rate of movement of material through the drum can be regulated, and by regulating the opening in the box 17, the supply of steam, and the speed of the fans the amount of air passing through the drum can be regulated. From this it will be seen that the material in the drum, such as cement, can be caused to receive the desired amount of moisture to effect the desired amount of efflorescence of the material.

What I claim as new, and desire to secure by Letters Patent, is—

1. In a machine for adding moisture to materials, the combination with a rotating drum, of means for feeding material to be moistened into one end of the drum, means for causing the material to be picked up and dropped in the drum, means for causing the material to progress through the drum, and means for introducing moisture in the form of a vapor into the delivery end of the drum.

2. In a machine for adding moisture to materials, the combination with a rotating drum, of means for feeding material to be moistened into one end of the drum, means for causing the material to be picked up and dropped in the drum, means for causing the material to progress through the drum, means for introducing moisture in the form of a vapor into the delivery end of the drum and means for regulating the amount of moisture introduced.

3. In a machine for adding moisture to materials, the combination with a rotating drum, of means for feeding material to be moistened into one end of the drum, means for causing the material to be picked up and dropped in the drum, means for causing the material to progress through the drum, means for introducing moisture into the drum, and means for withdrawing the air from the drum.

4. In a machine for adding moisture to materials, the combination with a rotating drum, of means for feeding material to be moistened into one end of the drum, means for causing the material to be picked up and dropped in the drum, means for causing the material to progress through the drum, means for introducing moisture into the drum, means for withdrawing the air from the drum and separating the dust from the air.

5. In a machine for adding moisture to materials, the combination with a rotating drum, of means for feeding material to be moistened into one end of the drum, means for causing the material to be picked up and dropped in the drum, means for causing the material to progress through the drum, means for introducing moisture into the drum and means for withdrawing the air from the drum and separating the dust from the air.

6. A rotating cylinder provided on its interior with a series of plates arranged at an angle to the axis of rotation of the cylinder, said plates forming by their faces an interrupted screw whereby when the cylinder is rotated, the plates will act to feed material through the cylinder and a series of longitudinal shelves adapted to pick up and drop the material in the cylinder as it rotates.

7. In a machine for adding moisture to materials, the combination with an agitating device into which the material to be moistened is fed and means for supplying moisture-laden air to the agitating device, of a casing connected to the agitating device and provided with an exhausting means whereby the air will be withdrawn from the agitating device, of a filtering device located between the exhausting device and the agitating device through which the air is drawn and by which it is deprived of dust carried in suspension.

8. In a machine for adding moisture to materials, the combination with an agitating device, of means for supplying moisture-laden air to one end of the device and means for withdrawing the air from the other end of the device, of a filter through which the air passes, said filter consisting of a plurality of frames wedge-shaped in cross-section and covered with filtering material, said frames being arranged in the form of a cylinder as and for the purpose described.

9. In a machine for adding moisture to materials, the combination with an agitating device, of means for supplying moisture-laden air to the agitating device, said supplying device consisting of a casing, an opening in the casing through which air may pass a steam-jet entering the casing to supply moisture to the air and a water-supply connected to the steam-jet, whereby water may be mixed with the steam before the same enters the casing.

10. In a machine for adding moisture to materials, the combination with an agitating device, of means for supplying moisture-laden air to the agitating device, said supplying device consisting of a casing, an opening in the casing through which air may pass and a steam-jet entering the casing to supply moisture to the air, and means for adding water to the steam before it enters the casing.

11. In a machine for adding moisture to materials, the combination with an agitating device, of means for supplying moisture-laden air to the agitating device, said supplying device consisting of a casing, an opening in the casing through which air may pass, a steam-jet entering the casing to supply moisture to the air and a partition extending part way across the casing against which the steam impinges.

12. In a machine for adding moisture to materials, the combination with an agitating device, of means for supplying moisture-laden air to the agitating device, said supplying device consisting of a casing, an opening in the casing through which the air may pass, a steam-jet entering the casing to supply moisture to the air, a partition extending part way across the casing against which the steam impinges and a reticulated fabric extending from the end of the partition to the side of the casing.

Signed by me at the American Legation, Tokio, Japan, this 7th day of December, 1904.

KASHO TSUJI.

Witnesses:
 GEO. H. LEIDMORE,
 R. S. MILLER.